(12) United States Patent
Moon et al.

(10) Patent No.: US 12,230,780 B2
(45) Date of Patent: Feb. 18, 2025

(54) ELECTRODE FOR SECONDARY BATTERY AND METHOD OF MANUFACTURING THE SAME

(71) Applicant: LG Energy Solution, Ltd., Seoul (KR)

(72) Inventors: Jaewon Moon, Daejeon (KR); Ki Hoon Paeng, Daejeon (KR); Hyung Seok Han, Daejeon (KR); Sang Myeon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 614 days.

(21) Appl. No.: 17/608,615

(22) PCT Filed: Nov. 23, 2020

(86) PCT No.: PCT/KR2020/016544
§ 371 (c)(1),
(2) Date: Nov. 3, 2021

(87) PCT Pub. No.: WO2021/125588
PCT Pub. Date: Jun. 24, 2021

(65) Prior Publication Data
US 2022/0231267 A1   Jul. 21, 2022

(30) Foreign Application Priority Data
Dec. 19, 2019   (KR) .................. 10-2019-0170940

(51) Int. Cl.
H01M 4/04     (2006.01)
H01M 4/02     (2006.01)
(Continued)

(52) U.S. Cl.
CPC ....... H01M 4/0404 (2013.01); H01M 4/0435 (2013.01); H01M 4/0471 (2013.01);
(Continued)

(58) Field of Classification Search
CPC ............. H01M 4/0404; H01M 4/0435; H01M 4/0471; H01M 4/13; H01M 4/742;
(Continued)

(56) References Cited

U.S. PATENT DOCUMENTS

2019/0237746 A1*  8/2019  Sato ................... H01M 10/0585
2020/0020923 A1*  1/2020  Yoshida .............. H01M 50/538
2020/0321658 A1  10/2020  Fukunaga et al.

FOREIGN PATENT DOCUMENTS

CN    102544592 A    7/2012
CN    105453329 A    3/2016
(Continued)

OTHER PUBLICATIONS

Extended European Search Report including Written Opinion for Application No. 20902387.8 dated Aug. 12, 2022, pp. 1-10.
(Continued)

*Primary Examiner* — Matthew W Van Oudenaren
(74) *Attorney, Agent, or Firm* — Lerner David LLP (57) ABSTRACT

The present disclosure relates to an electrode for a secondary battery, including: an electrode current collector including a coated portion and a non-coated portion, and an active material layer located on the coated portion of the electrode current collector, wherein at least perforated portion is formed on the boundary surface between the coated portion and the non-coated portion.

9 Claims, 8 Drawing Sheets

(51) Int. Cl.
*H01M 4/13* (2010.01)
*H01M 50/46* (2021.01)

(52) U.S. Cl.
CPC ............ *H01M 4/13* (2013.01); *H01M 50/46* (2021.01); *H01M 2004/021* (2013.01)

(58) Field of Classification Search
CPC ...... H01M 4/70; H01M 50/46; H01M 50/461; H01M 50/463; H01M 2004/021; H01M 2004/027; H01M 2004/028; H01M 2004/029; H01M 10/0404; H01M 10/0409; H01M 10/0431; H01M 10/0587; H01M 10/4235
See application file for complete search history.

(56) References Cited

FOREIGN PATENT DOCUMENTS

| | | | |
|---|---|---|---|
| CN | 109155394 A | | 1/2019 |
| JP | 2005044539 | * | 2/2005 |
| JP | 2005044539 A | | 2/2005 |
| JP | 2007273390 A | | 10/2007 |
| JP | 2010015851 A | | 1/2010 |
| JP | 2012074327 | * | 4/2012 |
| JP | 2012074327 A | | 4/2012 |
| JP | 2013-065517 A | | 4/2013 |
| JP | 2014179217 A | | 9/2014 |
| JP | 2017228349 A | | 12/2017 |
| KR | 20080051647 A | | 6/2008 |
| KR | 20120068341 A | | 6/2012 |
| KR | 101876402 B1 | | 7/2018 |
| KR | 20180115152 A | | 10/2018 |
| KR | 20190084571 A | | 7/2019 |
| WO | WO2018179968 | * | 4/2018 |

OTHER PUBLICATIONS

International Search Report for PCT/KR2020/016544 dated Mar. 8, 2021. 3 pgs.

* cited by examiner

ELECTRODE FOR SECONDARY BATTERY AND METHOD OF MANUFACTURING THE SAME

CROSS-REFERENCE TO RELATED APPLICATIONS

The present application is a national phase entry under 35 U.S.C. § 371 of International Application No. PCT/KR2020/016544, filed on Nov. 23, 2020, which claims priority to Korean Patent Application No. 10-2019-0170940, filed on Dec. 19, 2019, the disclosures of which are incorporated herein by reference in their entirety.

TECHNICAL FIELD

The present disclosure relates to an electrode for a secondary battery and a method of manufacturing the same, and more particularly, to an electrode for a secondary battery for controlling tensile residual stress and a method of manufacturing the same.

BACKGROUND ART

The secondary battery can be formed by inserting an electrode assembly composed of a positive electrode plate, a negative electrode plate, and a separator into a case, and then sealing the can. A positive electrode plate or a negative electrode plate (hereinafter, referred to as "electrode plate") can be configured by coating an active material slurry onto a positive conductive current collector or a negative conductive current collector to a predetermined thickness, interposing a separator between the positive electrode conductive current collector and the negative electrode conductive current collector, and winding the plate in a jelly-roll type many times or laminating it in a plurality of layers to form an electrode assembly.

The electrode plate may be formed of an active material coating layer coated with an active material slurry and a non-coated portion. The active material coating layer can include a roll process for increasing the adhesiveness to the electrode current collector and increasing the volume density of the active material. The rolled electrode plate can, after drying, be used by being passed through a cutter having a certain width and cut into a predetermined size.

The roll process has a problem that a compression deviation occurs due to a difference in thickness between the coating layer and the non-coated portion at the time of rolling the electrode plate. Due to such a deviation, unbalanced plastic deformation of the electrode current collector may occur, thereby causing a residual stress. In particular, the tensile residual stress may cause a reduction of fatigue durability and a reduction of fracture strength of components.

Figure 1:
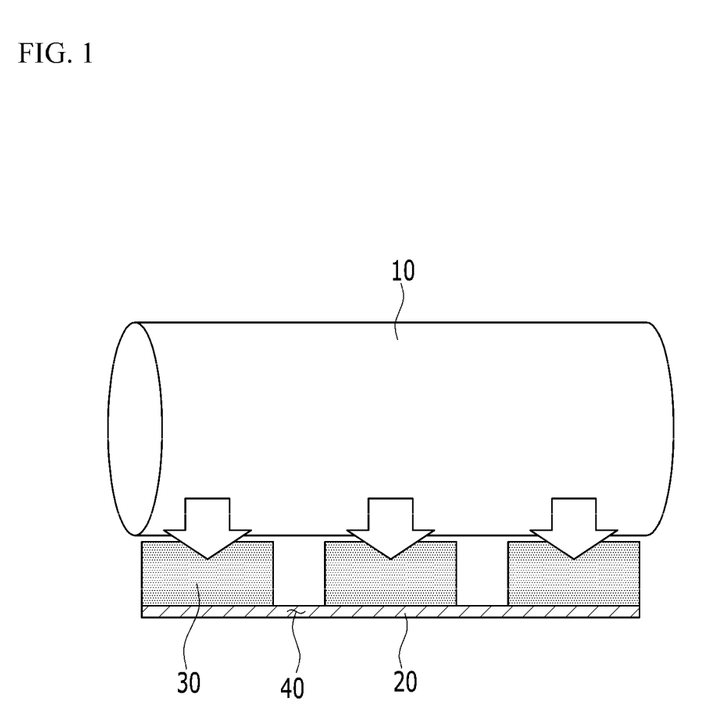
FIG. 1 is a schematic diagram showing a roll process using a conventional rolling device.
Figure 2:
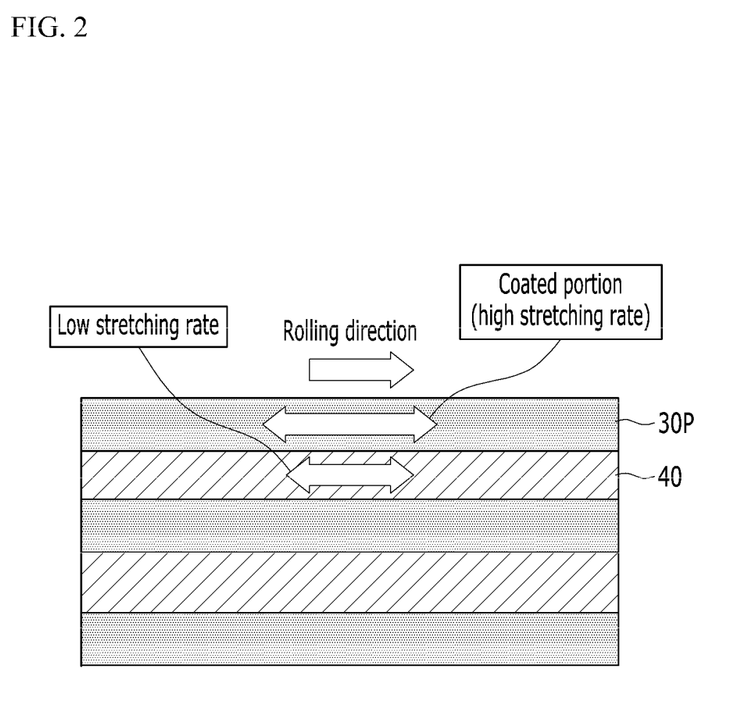
FIG. 2 is a plan view showing an electrode plate after rolling.

FIG. 1 is a schematic diagram showing a roll process using a conventional rolling device. FIG. 2 is a plan view showing an electrode plate after rolling.

Referring to FIG. 1, a roll process of rolling a coated layer 30 and a non-non-coated portion 40 formed on an electrode current collector 20 by a rolling roll 10 may be performed. At this time, the pressure is concentrated on the coated layer 30, and as shown in FIG. 2, a difference occurs between the degree of stretching of the coated portion 30P and the degree of stretching of the non-coated portion 40, and wrinkles may be generated in the non-coated portion 40. Due to the wrinkles of the non-coated portion 40 generated during rolling, process defects such as electrode disconnection may occur in a subsequent process. In particular, while a high tensile residual stress remains at a boundary surface between the coated portion 30P and the non-coated portion 40, they can continuously receive weak stress due to the contraction and expansion of the electrode, and may become vulnerable to fracture.

DETAILED DESCRIPTION OF THE INVENTION

Technical Problem

It is an object of the present disclosure to provide an electrode for a secondary battery for controlling tensile residual stress and a method of manufacturing the same.

However, the objects of embodiments of the present disclosure are not limited to the aforementioned objects, and can be variously expanded within the scope of the technical idea included in the present disclosure.

Technical Solution

According to one embodiment of the present disclosure, there is provided an electrode for a secondary battery, comprising: an electrode current collector including a coated portion and a non-coated portion, and an active material layer located on the coated portion of the electrode current collector, wherein at least perforated portion is formed on the boundary surface between the coated portion and the non-coated portion.

The electrode for a secondary battery may further include an insulator disposed on a boundary surface between the coated portion and the non-coated portion while covering the perforated portion.

The insulator may be an insulating tape.

The electrode for a secondary battery may further include a heat source applying portion that overlaps with the insulator and is formed along a boundary surface between the coated portion and the non-coated portion.

According to another embodiment of the present disclosure, there is provided a method of manufacturing an electrode for a secondary battery, comprising the steps of: coating an active material onto an electrode current collector to form a coated portion and a non-coated portion, and performing perforation on the boundary surface between the coated portion and the non-coated portion, wherein the step of performing perforation on the boundary surface between the coated portion and the non-coated portion removes or relaxes a tensile residual stress caused by the formation of wrinkles on the boundary surface by the perforation.

The step of performing perforation on the boundary surface between the coated portion and the non-coated portion is performed before a roll process performed along the moving direction of the electrode current collector, and the roll process may include at least one of a process of rolling a coated portion and a non-coated portion of the electrode current collector and a process of notching a coated portion and a non-coated portion of the electrode current collector.

The step of performing perforation on the boundary surface between the coated portion and the non-coated portion may include a step of forming a plurality of holes along the boundary surface.

The method of manufacturing an electrode for a secondary battery may further include a step of heat-treating the electrode current collector.

The step of heat-treating the electrode current collector may include a step of applying a heat source to a region covering a plurality of holes formed along the boundary surface.

The method of manufacturing an electrode for a secondary battery may further include a step of forming an insulator located on a boundary surface between the coated portion and the non-coated portion while covering the perforated portion.

The area of the portion to which the heat source is applied is equal to or smaller than the area in which the insulator is formed.

According to yet another embodiment of the present disclosure, there is provided an electrode assembly comprising the above-mentioned electrode for a secondary battery.

Advantageous Effects

According to the embodiments of the present disclosure, before removing the tensile residual stress using a heat source, the tensile residual stress can be released by perforation, thereby manufacturing an electrode in which the tensile residual stress is controlled. Therefore, it is possible to reduce the occurrence of fracture due to fatigue fracture at the boundary surface between the electrode and the non-coated portion.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 3:
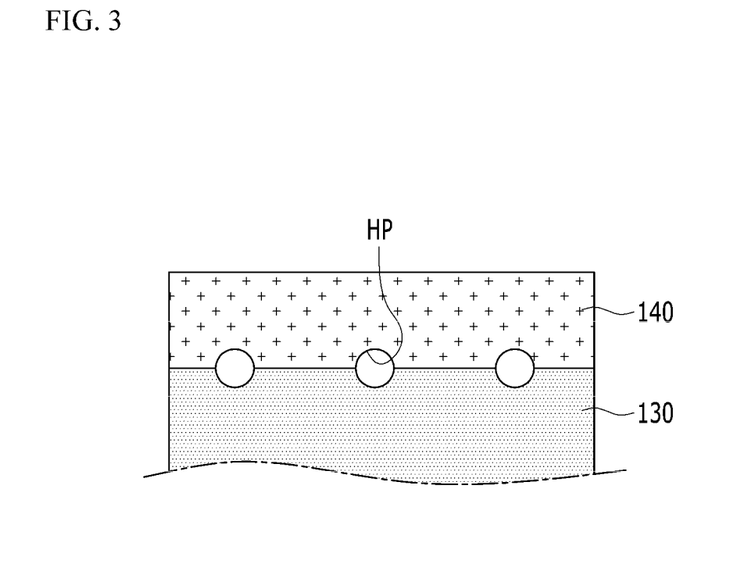
FIGS. 3 to 5 are plan views showing a method of manufacturing an electrode for a secondary battery according to an embodiment of the present disclosure.
Figure 4:
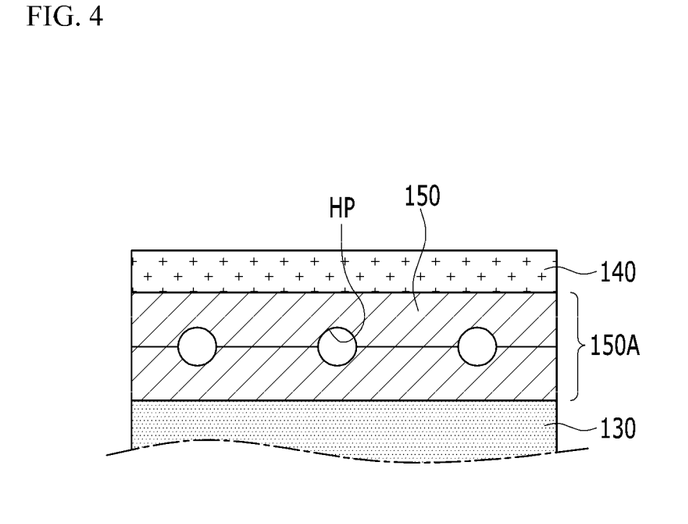
Figure 5:
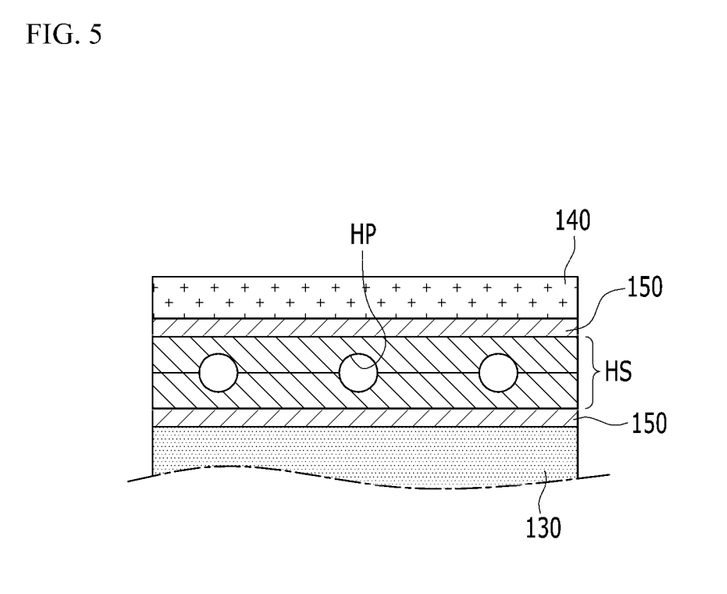

FIGS. 3 to 5 are plan views showing a method of manufacturing an electrode for a secondary battery according to an embodiment of the present disclosure.

The method of manufacturing an electrode for a secondary battery according to an embodiment of the present disclosure includes a step of coating an active material onto an electrode current collector to form a coated portion 130 and a non-coated portion 140.

The electrode slurry can be coated onto the electrode current collector while rolling the electrode current collector using a roller. The electrode slurry is a mixture produced in a state of low fluidity by mixing fine solid particles in a liquid. The electrode slurry, which is prepared by mixing a binder with a solvent in a certain ratio, can be coated with a thin film onto an electrode current collector, and subjected to a drying and press-bonding process to manufacture an electrode for a secondary battery.

Among the electrode current collector, the positive electrode current collector is not particularly limited as long as it has high conductivity without causing a chemical change in an electrode for a secondary battery according to the present embodiment, and for example, stainless steel, aluminum, nickel, titanium, calcined carbon, or aluminum or stainless steel having a surface treated with carbon, nickel, titanium, silver, etc. may be used. A fine unevenness may be formed on a surface of the positive electrode current collector to increase the binding force of the positive electrode active material, and the positive electrode current collector may have various shapes such as a film, a sheet, a foil, a net, a porous body, a foam body and a non-woven fabric.

The electrode slurry includes a positive electrode active material, and the positive electrode active material may be, for example, a layered compound such as lithium cobalt oxide ($LiCoO_2$) or lithium nickel oxide ($LiNiO_2$) or a compound substituted with one or more transition metals; lithium manganese oxides such as chemical formulae $Li_{1+x}Mn_{2-x}O_4$ (where x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}O_2$ (where M=Co, Mn, Al, Cu, Fe, Mg, B or Ga, and x=0.01-0.3); lithium manganese composite oxide represented by chemical formulae $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ with a Li portion of the chemical formula substituted with an alkaline earth metal ion; a disulfide compound; $Fe_2(MoO_4)_3$, and the like, but is not limited thereto.

The positive electrode slurry can be prepared by coating a positive electrode mixture containing a mixture of the positive electrode active material, the conductive material and the binder onto the remaining portion excluding the uncoated portion, which is the part where an electrode tab is formed on the electrode current collector, followed by drying and pressing, and if necessary, a filler may be further added to the mixture.

The conductive material may be typically added in an amount of 1 to 50% by weight based on the total weight of the mixture containing the positive electrode active material. The conductive material is not particularly limited as long as it has high conductivity without causing a chemical change in the battery, and for example, graphite such as natural graphite and artificial graphite; carbon blacks such as carbon black, acetylene black, ketjen black, channel black, furnace black, lamp black, and thermal black, conductive fibers such as carbon fiber and metal fiber, metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

The binder is a component that assists in coupling of an active material, a conductive material, and the like, and in coupling of a current collector, and typically, may be added in an amount of 1 to 50% by weight based on the total weight of the mixture containing the positive electrode active material. An example of the binder may include polyvinylidene fluoride, polyvinyl alcohol, carboxymethylcellulose, starch, hydroxypropyl cellulose, regenerated cellulose, polyvinylpyrrolidone, tetrafluoroethylene, polyethylene, polypropylene, ethylene-propylene-diene terpolymer, sulfonated ethylene-propylene-diene terpolymer, styrene butadiene rubber, fluorine rubber, and various copolymers.

The filler is optionally used as a component for inhibiting the expansion of the positive electrode. The filler is not particularly limited so long as it is a fibrous material that does not cause chemical changes in the battery using the electrode assembly according to the present embodiment. Examples of the filler include olefin-based polymers such as polyethylene and polypropylene, and fibrous materials such as glass fiber and carbon fiber.

Among the electrode current collector, the negative electrode current collector is not particularly limited as long as it has high conductivity without causing a chemical change in an electrode for a secondary battery according to the present embodiment, and for example, copper, stainless steel, aluminum-cadmium alloy, and the like can be used. Further, similarly to the positive electrode current collector, a fine unevenness may be formed on a surface of the negative electrode current collector to increase the binding force of the negative electrode active material, and the positive electrode current collector may have various shapes such as a film, a sheet, a foil, a net, a porous body, a foam body and a non-woven fabric.

The negative electrode active material layer includes a negative electrode active material, and examples of the negative electrode active material may include carbons such as hardly graphitizable carbon and graphite-based carbon, metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, 3 elements in the periodic table, halogen; $0 < x \leq 1$; $1 \leq y \leq 3$; $1 \leq z \leq 8$), lithium metal, lithium alloys, silicon-based alloys, tin-based alloys, metal oxides such as SnO, $SnO_2$, PbO, $PbO_2$, $Pb_2O_3$, $Sb_2O_4$, $Sb_2O_5$, GeO, $GeO_2$, $Bi_2O_3$, $Bi_2O_4$ or $Bi_2O_5$, a conductive polymer such as polyacetylene, Li—Co—Ni based materials and the like.

The negative electrode active material layer can be prepared by coating a negative electrode mixture containing a mixture of the negative electrode active material, the conductive material and the binder onto the remaining portion excluding the portion where an electrode tab is formed on the negative electrode current collector, followed by drying and pressing, and if necessary, a filler may be further added to the mixture.

The electrode assembly according to an embodiment of the present disclosure includes a positive electrode plate, a negative electrode plate, and a separator interposed therebetween. The separator serves to electrically insulate the positive electrode plate and the negative electrode plate. The positive electrode plate includes a positive electrode current collector, and a positive electrode active material layer located between the positive electrode current collector and the separator. The negative electrode plate includes a negative electrode current collector, and a negative electrode active material layer located between the negative electrode current collector and the separator.

As the separator, an insulating thin film having high ion permeability and mechanical strength can be used. For example, a sheet or nonwoven fabric made of an olefin-based polymer such as polypropylene, glass fiber, polyethylene or the like having chemical resistance and hydrophobicity can be used.

Subsequently, the method of manufacturing an electrode for a secondary battery according to the present embodiment includes a step of performing perforation on the boundary surface between the coated portion 130 and the non-coated portion 140.

At the boundary surface between the coated portion 130 and the non-coated portion 140, when a subsequent roll process is performed, since the portion that receives force and the portion that does not receives force are generated due to the difference in thickness between the coated portion 130 and the non-coated portion 140, the highest tensile residual stress remains. Such tensile residual stresses appear in the form of wrinkles on the boundary surface. According to this embodiment, since the step of performing perforation on the boundary surface between the coated portion 130 and the non-coated portion 140 is included, the tensile residual stress caused by the formation of wrinkles in the non-coated portion can be removed or relaxed through the perforation.

The step of performing perforation on the boundary surface between the coated portion 130 and the non-coated portion 140 can be performed before a roll process performed along the moving direction of the electrode current collector. The roll process may include at least one of a process of rolling the coated portion 130 and the non-coated portion 140 of the electrode current collector, and a process of notching the coated portion 130 and the non-coated portion 140 of the electrode current collector.

The step of performing perforation on the boundary surface between the coated portion 130 and the non-coated portion 140 may include a step of forming a plurality of holes (HP) along the boundary surface. The plurality of holes HP may be circular as shown in FIG. 3, but its shape is not limited, and can be formed in various ways such as a quadrangle, a triangle, and a straight line.

Figure 6:
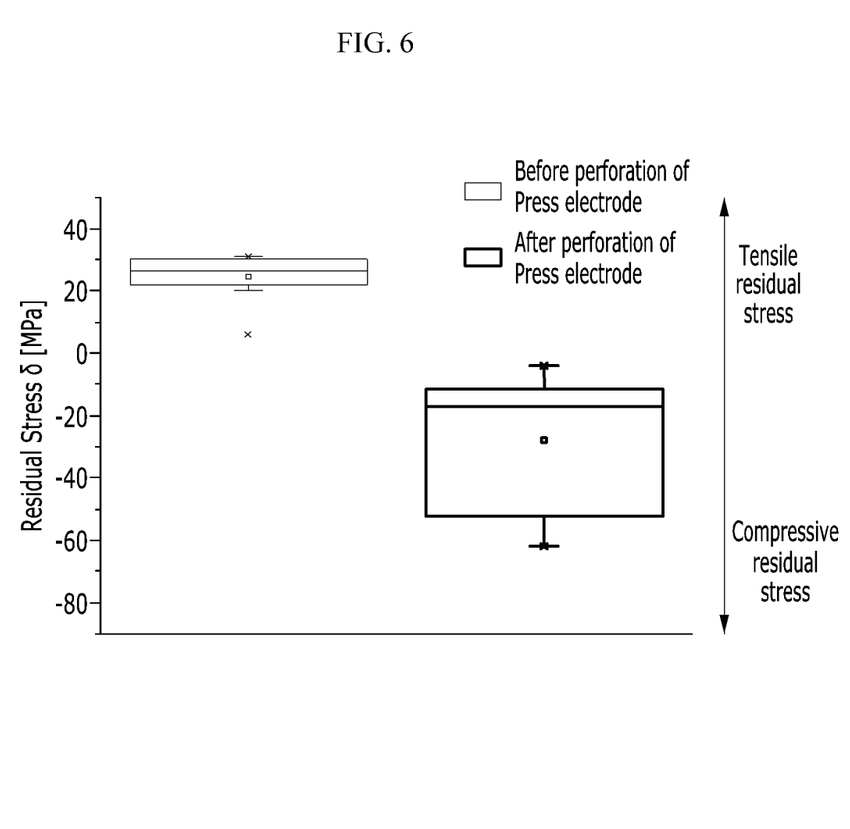
FIG. 6 is a graph of measuring the tensile residual stress of an electrode before and after perforation according to an embodiment of the present disclosure.

FIG. 6 is a graph of measuring the tensile residual stress of an electrode before and after perforation according to an embodiment of the present disclosure.

By performing perforation on the boundary surface between the coated portion 130 and the non-coated portion 140 according to the present embodiment, the tensile residual stress can be controlled, thereby reducing the risk of electrode disconnection, and these results can be confirmed through X-ray or the like. Referring to FIG. 6, it can be confirmed that there is a large difference in the tensile residual stress before and after perforation.

In order to remove the tensile residual stress using only the heat treatment described below, a high temperature is required, which may cause deterioration of the mechanical properties in the electrode current collector. However, when perforation is performed on the boundary surface between the coated portion 130 and the non-coated portion 140 according to the present embodiment, the temperature of subsequent heat treatment can be reduced to about 125 degrees Celsius or less, thereby preventing deterioration of the mechanical properties of the electrode current collector.

Next, referring to FIG. 4, the method of manufacturing an electrode for a secondary battery according to the present embodiment may include a step of forming an insulator 150 located on a boundary surface between the coated portion 130 and the non-coated portion 140 while covering the perforated portion. It is preferable that the first region 150A in which the insulator 150 is formed covers the plurality of holes HP formed in the perforated portion. The insulator 150 may be formed of an insulating tape or an insulating material coating layer. Due to the insulator 150, in a secondary battery manufactured by including the electrode for a secondary battery according to the present embodiment, it is possible to prevent the electrode current collector and electrodes having different polarities from making direct contact with each other. The reason for forming the insulator 150 is a step that is added from the viewpoint of stability for preventing the ignition of the electrode.

Figure 7:
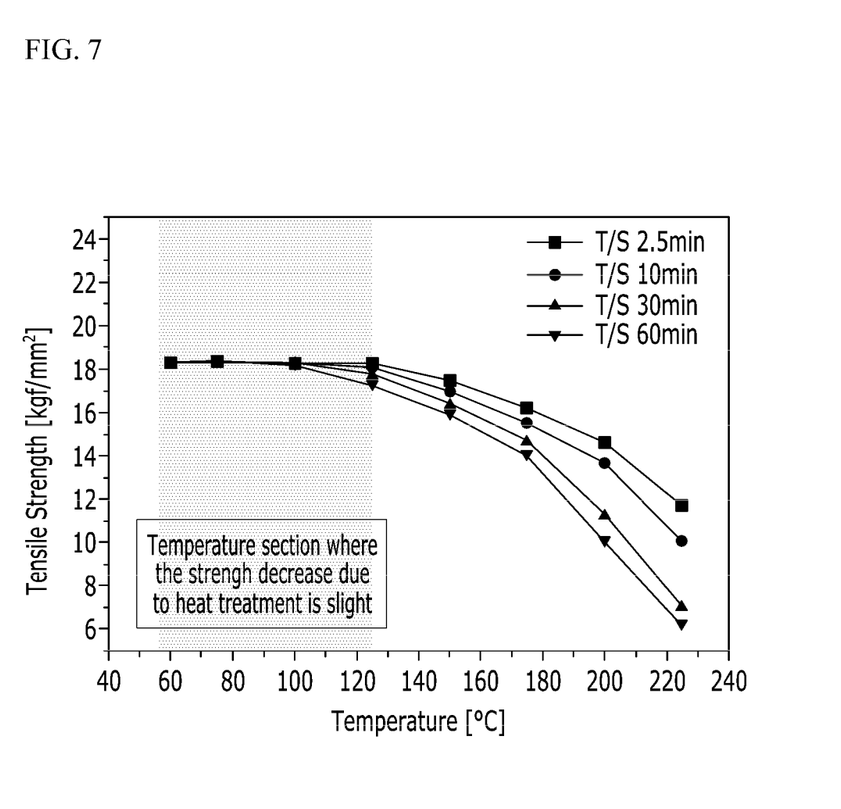
FIG. 7 is a graph showing a change in strength by a heat treatment step according to an embodiment of the present disclosure.

Next, referring to FIG. 5, the method of manufacturing an electrode for a secondary battery according to the present embodiment may include a step of heat-treating the electrode current collector. The step of heat-treating the electrode current collector includes a step of applying a heat source to a region covering a plurality of holes HP formed along the boundary surface the coated portion 130 and the uncoated portion 140. The heat source can be applied to form a heat source applying portion HS. In this way, the tensile residual stress can be additionally released due to the heat treatment step. FIG. 7 is a graph showing a change in strength by a heat treatment step according to an embodiment of the present disclosure.

As shown in FIG. 7, the heat treatment temperature according to the present embodiment may be approximately 125 degrees Celsius or less, and preferably 100 degrees or less.

The area of the portion where the heat source applying portion HS is formed may be equal to or smaller than the area where the insulator 150 is formed. When the area of the portion where the heat source applying portion HS is formed is larger than the area where the insulator 150 is formed, additional heat is applied to the active material layer formed on the coated portion 130, and it may affect the bonding force and mechanical properties of the electrode due to excessive drying of the side surface portion of the electrode. In addition, an unintended heat source may be applied, resulting in a waste of energy in the process.

According to the present embodiment, by adding a step of heat treatment under the condition that the mechanical strength of the electrode current collector is not lowered, it is possible to manufacture an electrode for a secondary battery in which the tensile residual stress is controlled.

The electrode for a secondary battery formed by the method for manufacturing a secondary battery according to an embodiment of the present disclosure described above will be described with reference to FIG. 8.

Figure 8:
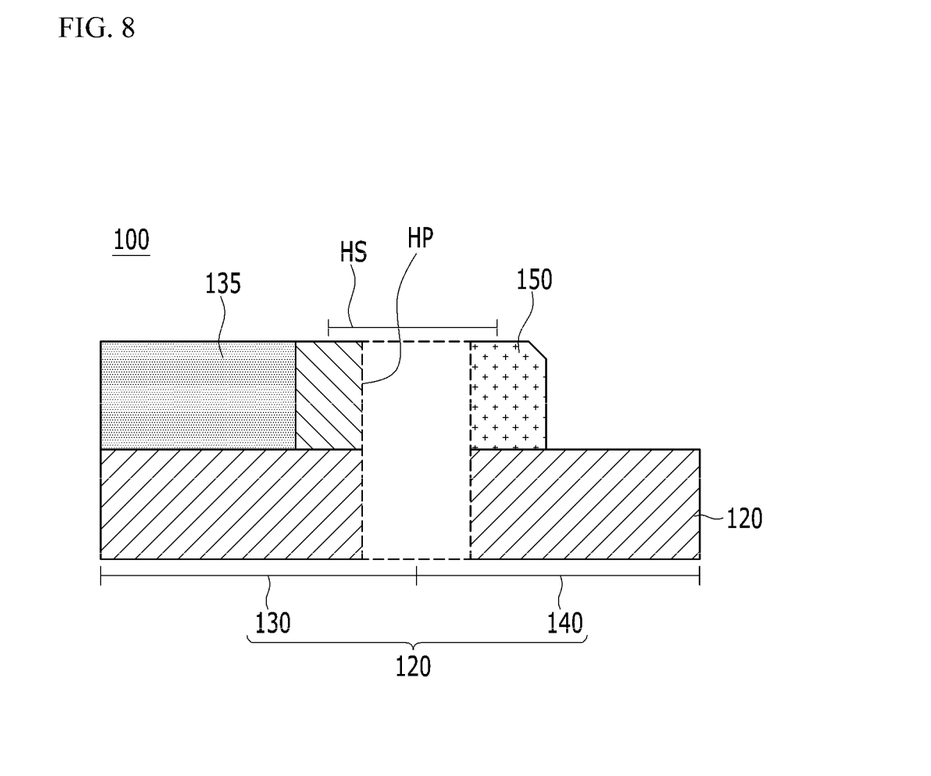
FIG. 8 is a cross-sectional view showing an electrode for a secondary battery according to another embodiment of the present disclosure.

FIG. 8 is a cross-sectional view showing an electrode for a secondary battery according to another embodiment of the present disclosure.

Referring to FIG. 8, an electrode 100 for a secondary battery according to another embodiment of the present disclosure includes an electrode current collector 120 including a coated portion 130 and a non-coated portion 140, and an active material layer 135 located on the coated portion 130 of the electrode current collector 120. Here, at least one hole HP is formed on the boundary surface between the coated portion 130 and the non-coated portion 140.

The electrode according to the present embodiment may further include an insulator 150 located at the boundary surface between the coated portion 130 and the non-coated portion 140 while covering a perforated portion including a plurality of holes HP. The insulator 150 may be formed of an insulating tape or an insulating material coating layer.

The electrode 100 according to the present embodiment further includes a heat source applying portion (HS) that overlaps with the insulator 150 and is formed along a boundary surface between the coated portion 130 and the non-coated portion 140.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

130: coated portion
140: non-coated portion
150: insulator
150A: first area
HP: hole
HS: heat source applying portion

The invention claimed is:

1. An electrode for a secondary battery, comprising:
an electrode current collector including a coated portion and a non-coated portion,
an active material layer located on the coated portion of the electrode current collector,
an insulator disposed on a boundary surface between the coated portion and the non-coated portion while covering a perforated portion,
wherein the perforated portion is defined along a boundary between the coated portion and the non-coated portion, and
wherein the perforated portion includes a plurality of holes extending through both the electrode current collector and the insulator.

2. The electrode for a secondary battery according to claim 1,
wherein the insulator is an insulating tape.

3. The electrode for a secondary battery according to claim 1,
which further comprises a heat source applying portion that overlaps with the insulator and is formed along the boundary surface between the coated portion and the non-coated portion.

4. A method of manufacturing an electrode for a secondary battery, comprising:
- coating an active material onto an electrode current collector to form a coated portion and a non-coated portion;
- forming an insulator located on a boundary surface between the coated portion and the non-coated portion;
- performing perforation on the boundary surface between the coated portion and the non-coated portion in a region covered by the insulator; and
- heat-treating the region covered by the insulator with a heat source at a temperature of less than or equal to 125° C.,
- wherein the heat-treating is only applied to the region covered by the insulator, and
- wherein the performing perforation on the boundary surface between the coated portion and the non-coated portion removes or relaxes a tensile residual stress caused by the formation of wrinkles on the boundary surface.

5. A method of manufacturing an electrode for a secondary battery according to claim 2,
- wherein the performing perforation on the boundary surface between the coated portion and the non-coated portion is performed before a roll process performed along a moving direction of the electrode current collector, and the roll process comprises at least one of a process of rolling the coated portion and the non-coated portion of the electrode current collector and a process of notching the coated portion and the non-coated portion of the electrode current collector.

6. The method of manufacturing an electrode for a secondary battery according to claim 5,
- wherein the performing perforation on the boundary surface between the coated portion and the non-coated portion comprises forming a plurality of holes along the boundary surface.

7. The method of manufacturing an electrode for a secondary battery according to claim 6,
- wherein the heat-treating the electrode current collector comprises applying a heat source to a region covering a plurality of holes formed along the boundary surface.

8. An electrode assembly comprising the electrode for a secondary battery as set forth in claim 1, and a separator.

9. A method of manufacturing an electrode for a secondary battery, comprising:
- coating an active material onto an electrode current collector to form a coated portion and a non-coated portion,
- forming an insulator located on a boundary surface between the coated portion and the non-coated portion;
- performing perforation on a boundary surface between the coated portion and the non-coated portion, and
- wherein the performing perforation includes forming a plurality of holes extending through both the electrode current collector and the insulator,
- wherein the performing perforation on the boundary surface between the coated portion and the non-coated portion removes or relaxes a tensile residual stress caused by the formation of wrinkles on the boundary surface.

* * * * *